G. E. PORTER.
UNIVERSAL JOINT.
APPLICATION FILED MAR. 11, 1915.
1,174,277.
Patented Mar. 7, 1916.
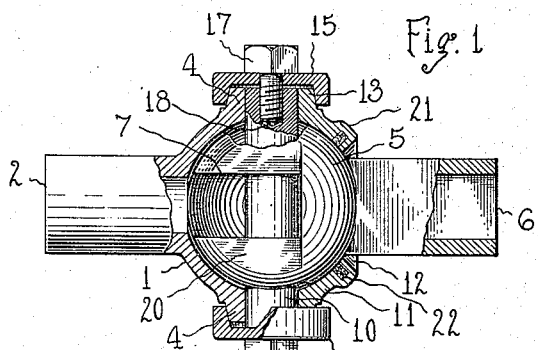
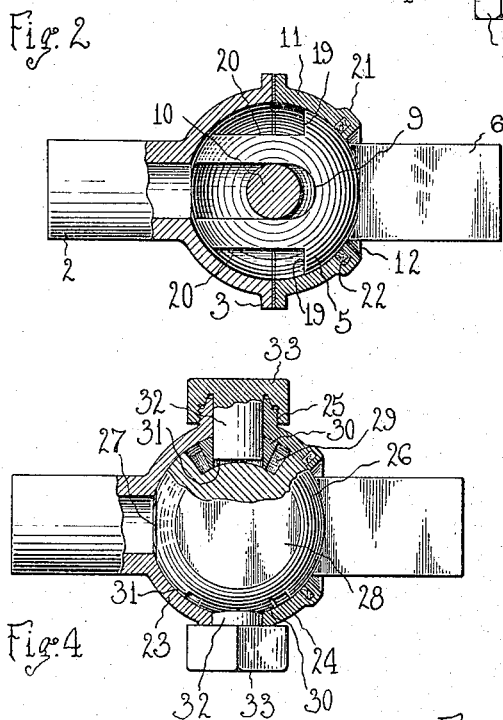
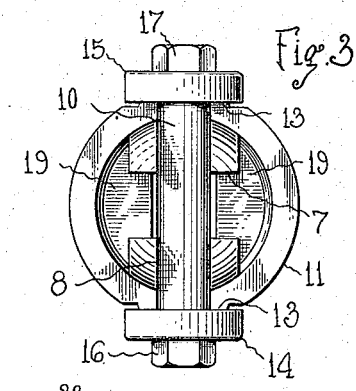
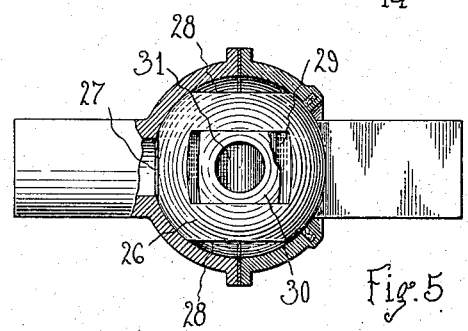
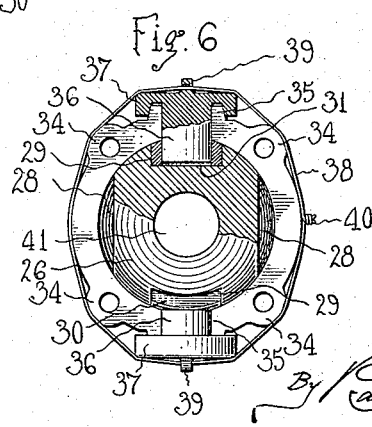
Inventor
Gilbert E. Porter
Witnesses
Karl H. Butler
Chas. W. Stauffiger
Attorneys
THE COLUMBIA PLANOGRAPH CO., WASHINGTON, D. C.

UNITED STATES PATENT OFFICE.

GILBERT E. PORTER, OF DETROIT, MICHIGAN.

UNIVERSAL JOINT.

1,174,277.  Specification of Letters Patent.  Patented Mar. 7, 1916.

Application filed March 11, 1915. Serial No. 13,563.

*To all whom it may concern:*

Be it known that I, GILBERT E. PORTER, a citizen of the United States of America, residing at Detroit, in the county of Wayne and State of Michigan, have invented certain new and useful Improvements in Universal Joints, of which the following is a specification, reference being had therein to the accompanying drawings.

This invention relates to universal joints, such as are employed for transmitting motion between shafts or other rotating objects, the angle between which is variable.

Universal joints are extensively used in machine tools and the like for transmitting motion from one shaft to another which occupies a variable position or angle with respect to the first. Such joints are also used in the transmission gear of many automobiles for transmitting motion from a spring supported engine or motor to the driving wheel. Various other uses for such joints are also well known, therefore, I contemplate utilization of my improvements in any field to which said improvements are adapted by reason of their nature.

An objection to universal joints as heretofore constructed is that their wearing surfaces are not sufficiently protected from dust, metal clippings and filings and the like, for which reason the efficiency of such joints often decreases rapidly and the bearing surface of journals become worn and cut. Another objection is the multiplicity of parts used in many joints and the fact that such joints require continuous lubrication.

With such defects in mind, this invention aims to ameliorate existing conditions by providing a universal joint possessing many advantages that may be characterized as follows: First, a universal joint which will cause both driving and driven members to revolve at the same angular speed and withstand severe lateral stresses without a material increase in the dimensions of the joint. Second, a universal joint of compact form having provision for a supply of oil in much greater quantity than can be furnished by the forms of oilers now in use for such joints, my improvements eliminating extraneous oil cups, or oil channels, which are liable to be clogged with dust, etc., the oil in my improved joint being contained within the cross of the joint and applied directly to regions requiring it, and in adequate and economical quantities. Third, a strong, simple and durable universal joint which shall present a large bearing surface in proportion to its diameter and which shall also present a neat and a finished appearance, free from projecting arms or parts which are liable to catch the clothing of operators, resulting in accidents, particularly when the joint is used in connection with exposed shafts or driven members.

The above are simply a few of the many advantages derived by my improved universal joint, and in order that my invention may be more fully understood, reference will now be had to the drawings wherein, there are illustrated the preferred embodiments of my invention, but it is to be understood that the structural elements are susceptible to such changes, in the size, shape and manner of assemblage, as fall within the scope of the appended claims.

In the drawings, Figure 1 is a side elevation of the universal joint, partly broken away and partly in section; Fig. 2 is a plan of the same, partly in horizontal section; Fig. 3 is an end view of a portion of the universal joint illustrating the ball member and a portion of the socket; Fig. 4 is a side elevation of a modified form of universal joint, partly broken away and partly in section; Fig. 5 is a plan of the same, partly broken away and partly in section, and Fig. 6 is a cross sectional view of a further modified form of universal joint.

In the drawings, 1 denotes a semi-spherical socket member provided with a shaft coupling sleeve 2. The edges of the socket member 1 are flanged, as at 3 and at diametrically opposed points the edges of the socket member are offset to form semi-cylindrical bearings 4 having outer tapering walls for a purpose that will hereinafter appear.

5 denotes a spherical ball member having a shaft coupling sleeve 6. The ball member 5 has a transverse groove 7 and a vertical groove 8, said grooves intersecting axes of the ball member. The groove 8 has the inner or bottom wall 9 thereof concave in cross section and convex in longitudinal section, whereby at a point intermediate the ends of said wall, the ball member 5 will bear against a pin 10 disposed in the vertical slot 8 and engaging the bearings 4.

11 denotes a cupped coupling member which coöperates with the member 1 in providing a socket for the ball member. The cupped coupling member 11 bears upon the periphery of the ball member and has a flared opening 12 providing clearance for the shaft coupling sleeve 6. The coupling member 11 also has diametrically opposed semi-cylindrical bearings 13 similar to the bearings 4 of the socket member and coöperating therewith in holding the ends of the pin 10. To retain the ends of the pin 10 in the bearings 4 and 13 and at the same time retain the elements of the universal joint assembled, caps 14 and 15 are employed. The cap 14 is on an end of the pin 10 having a rectangular shank or facet 16 which permits of the pin 10 being held by a wrench or suitable instrument while the cap 15 and the fastening means thereof are assembled. The cap 14 may be integral with or detachable from the pin 10 and the cap 15 may be integral with or detachable from a screw bolt 17 extending through the cap 15 into screwthreaded engagement with the walls of a socket 18 provided therefor in the end of the pin 10. The caps 14 and 15 engage the outer tapering walls of the bearings 4 and 13 and draw the socket and coupling members together precluding any possibility of these members becoming accidentally displaced relative to each other.

The ball member 5 has diametrically opposed sides thereof cut away or recessed, as at 19 and the walls 20 of said recesses are in parallelism with the opposing walls of the groove 8. The recesses 19 reduce the weight of the ball member 5, eliminates what would be otherwise a large frictional area, and provides clearance for a lubricant in the joint. With the recesses 19 in communication with the intersecting grooves 7 and 8 lubricant can easily find its way to the pin 10 and the surfaces of the ball member bearing upon the socket member or coupling member. To prevent the lubricant from escaping by the opening 12 of the coupling member 11, an enlargement 21 is formed around the opening 12 and in said enlargement is placed a packing ring 22, preferably made of felt, said packing ring bearing upon the periphery of the ball member 5 and preventing lubricant from reaching the opening 12 of the coupling member.

From the novel construction of the preferred form of universal coupling as just described, it will be noted that the ball member 5 has a comparatively small bearing surface upon the coupling member 11, and that the four arms, as best shown in Fig. 3, protruding from the base of the ball member 5 simply serve as a guide for the ball member and as means for causing rotative continuity between the socket member and the ball member besides permitting these members to be angularly disposed.

Reference will now be had to Figs. 4 and 5 illustrating a modification of my invention and it will be observed that the socket and coupling members 23 and 24 are somewhat similar to the members 1 and 11, about the only difference being that the bearings of said members are exteriorly screwthreaded, as at 25. Between these members is a substantially spherical ball member 26 having the inner end thereof flattened, as at 27; diametrically opposed sides thereof flattened or cut away, as at 28, and diametrically opposed sides thereof provided with segmental recesses 29. Slidable lengthwise in the recesses 29 are segmental blocks 30 provided with opening 31 to receive trunnions 32 mounted in the bearings of the members 23 and 24 and carried by caps 33 screwed upon said bearings. In this modified form the ball member 26 is practically solid but is cut away sufficiently to reduce weight, friction and provide clearance for a lubricant. With the blocks 30 of less length than the recesses 29, the members 23 and 24 can be angularly disposed and yet rotate in synchronism.

In the modification shown by Fig. 6, the socket and coupling members have apertured lugs 34 by which said members can be secured together by the aid of screws or similar fastening means (not shown). The socket and coupling members also have bearings 35 for trunnions 36 provided with caps 37. The gudgeons 36 are associated with a ball member and blocks similar to that shown in Figs. 4 and 5, and the gudgeons 36 are retained in the bearings 35 by a wire 38 passing through apertured lugs 39 of the cap 37 and having the ends thereof twisted or otherwise connected together, as at 40. In this form the ball member has an opening 41 in communication with the shaft coupling sleeve of said member and the weight of the ball member shown in Figs. 4 and 5 can be reduced by providing such ball member with a similar opening.

In using the terms "vertical," "transverse" and "ends" it is to be understood that such terms are simply for the convenience of describing the invention, as the universal joint can be used in various positions which would necessarily require more appropriate terms.

What I claim is:—

1. In a universal joint, a socket member, a coupling member abutting said socket member, a ball member in said socket member provided with intersecting grooves, caps connecting said coupling member to said socket member, and a pin carried by said caps and extending through the grooves of said ball member.

2. In a universal joint, a socket member, a coupling member abutting said socket member, a ball member in said socket member having a plurality of arms maintaining said ball member in engagement with said coupling member, caps connecting said coupling member to said socket member and a pin carried by said caps and extending between the arms of said ball member to cause rotative continuity of said socket and ball members.

3. In a universal joint, a socket member having bearings, a coupling member having bearings abutting the bearings of said socket member, a ball member in said socket member provided with intersecting grooves and cut away sides, caps on the bearings of said socket and coupling members, and means carried by said caps and extending through the grooves of said ball member to cause rotative continuity of said socket member relative to said ball member.

4. In a universal joint, a socket member having bearings, a coupling member having bearings abutting the bearings of said socket member, a ball member in said socket member provided with intersecting grooves and cut away sides, caps on the bearings of said socket and coupling members, and a pin carried by said caps and extending through the grooves of said ball member.

5. In a universal joint, a socket member, a coupling member in engagement therewith, a ball member in said socket member cut away to provide clearance for lubricant, caps connecting said coupling member to said socket member, and means carried by said caps in movable engagement with said ball member and adapted to cause rotative continuity between said socket and ball members.

6. In a universal joint, a socket member, a coupling member in engagement therewith, a ball member in said socket member cut away to provide clearance for a lubricant therein, caps connecting said coupling member to said socket member, and pins carried by said caps and movably engaging said ball member.

In testimony whereof I affix my signature in presence of two witnesses.

GILBERT E. PORTER.

Witnesses:
  ANNA M. DORR,
  KARL H. BUTLER.

Copies of this patent may be obtained for five cents each, by addressing the "Commissioner of Patents, Washington, D. C."